(12) United States Patent
Dewey et al.

(10) Patent No.: US 6,378,640 B1
(45) Date of Patent: Apr. 30, 2002

(54) DEVICE AND METHOD TO HOLD SOUND INSULATION IN VEHICLE HOOD

(75) Inventors: Dallas D. Dewey, Hicksville, OH (US); Melvin A. Hendricks, Fort Wayne; Mark D. Oberly, Muncie, both of IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/675,613

(22) Filed: Sep. 29, 2000

(51) Int. Cl.[7] ............................................... B62D 25/10
(52) U.S. Cl. ................... 180/69.2; 180/69.22; 267/164; 267/182; 248/302
(58) Field of Search ............................... 267/219, 228, 267/257, 273, 40, 66, 164, 182; 248/302; 180/69.2, 69.21, 69.22, 69.23, 69.24; 52/712

(56) References Cited

U.S. PATENT DOCUMENTS

| | | | |
|---|---|---|---|
| 2,194,902 A | * 3/1940 | Heuer | |
| 2,257,633 A | * 9/1941 | Bank | 267/164 |
| 2,598,456 A | * 5/1952 | Snyder | 267/164 |
| 3,801,088 A | * 4/1974 | Peipers et al. | 267/164 |
| 3,829,150 A |   8/1974 | Moore | |
| 4,023,323 A | * 5/1977 | Fortin | 52/712 |
| 4,842,465 A |   6/1989 | Pease et al. | |
| 4,971,388 A | * 11/1990 | Knaggs | |
| 5,806,620 A | * 9/1998 | DeRees | 180/69.21 |
| 5,831,225 A |  11/1998 | Campbell | |
| 5,857,736 A | * 1/1999 | Feathers | |
| 5,988,757 A | * 11/1999 | Vishay et al. | |
| 6,116,366 A | * 9/2000 | Creswick et al. | 180/69.2 |

* cited by examiner

*Primary Examiner*—Brian L. Johnson
*Assistant Examiner*—Bryan Fischmann
(74) *Attorney, Agent, or Firm*—Jeffrey P. Calfa; Neil T. Powell; Dennis Kelly Sullivan

(57) ABSTRACT

A spring designed to be mounted adjacent and in conformance with a convex or concave surface that has varying radii of curvature. The stiffness against bending of the spring varies along its longitudinal axis. The stiffness against bending of various portions of the spring is proportional to the radii of curvature of portions of the surface adjacent which each portion of the spring is to be disposed. The mounting structure for the spring includes female mounting members that are to be engaged to male mounting members. The female mounting members and male mounting members can be engaged to one another by sliding the two components together. The spring and mounting system are particularly well adapted for holding objects adjacent an inner surface of body panels of a vehicle.

30 Claims, 12 Drawing Sheets

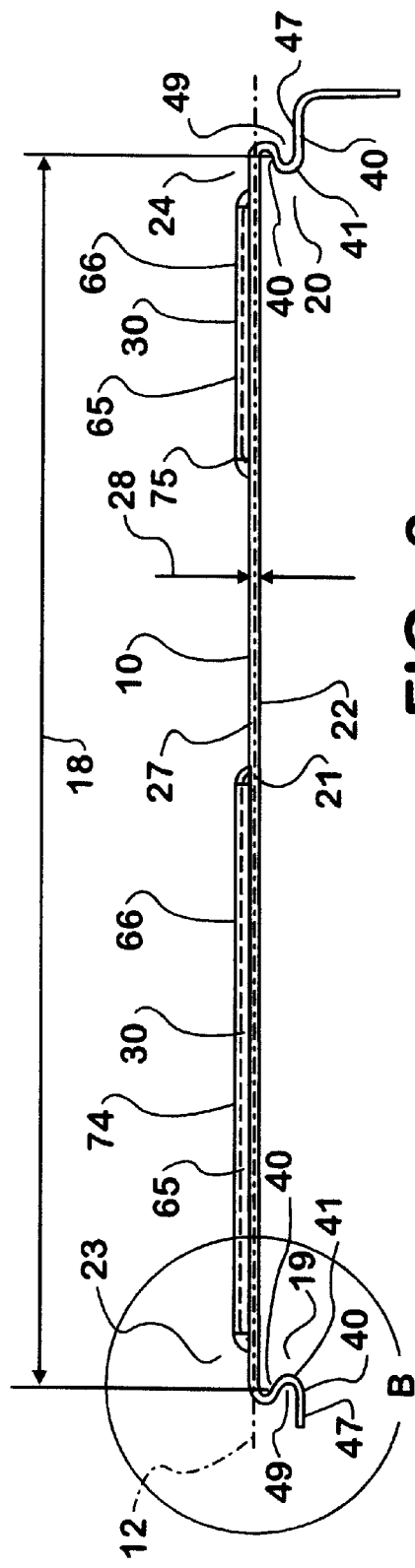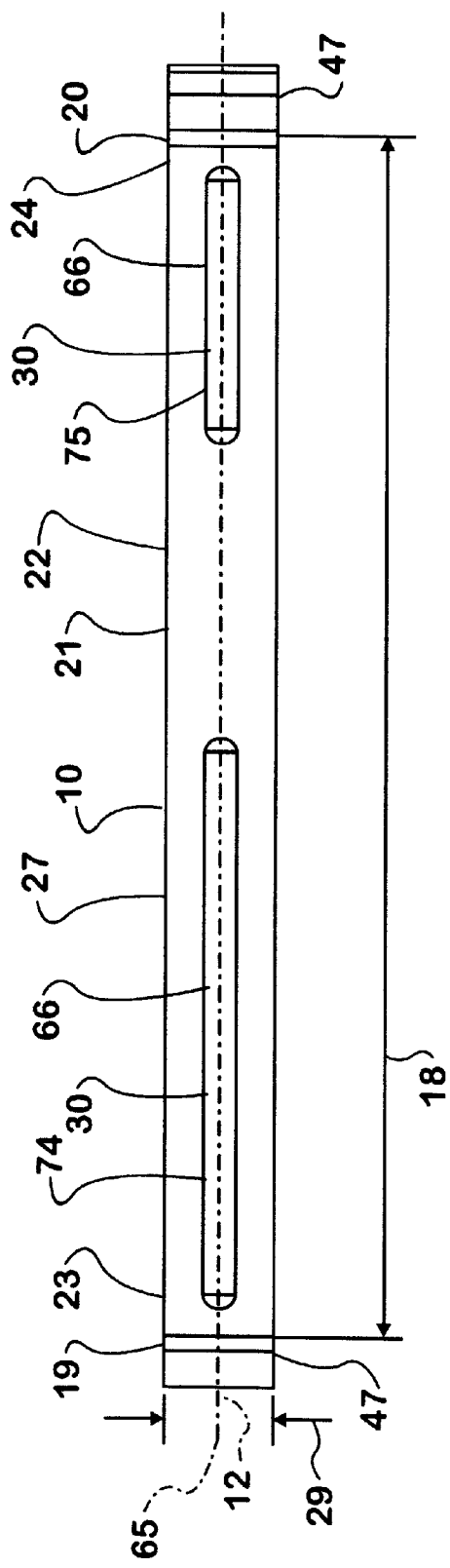

DEVICE AND METHOD TO HOLD SOUND INSULATION IN VEHICLE HOOD

BACKGROUND OF THE INVENTION

The present invention is a spring that is designed to bend along its longitudinal axis and conform to a spring conformance surface that is substantially either convex or concave along the entire portion that the spring is meant to conform to. The spring conformance surface that the spring is designed to conform to may also have greatly varying radii of curvature along the portion that the spring is intended to conform to. Springs that can be bent along their longitudinal axis to conform to such spring conformance surfaces are known. An example of such a prior art spring is shown in FIG. 1. In FIG. 1 the prior art spring is shown in a bent state as it would be disposed when it were installed and conformed to a spring conformance surface such as the underside of a hood of a vehicle which is shown in FIG. 1. Surface conforming springs of the prior art can be of a number of different constructions. Most surface conforming springs have a longitudinal axis central to a body of the spring and sectional planes disposed perpendicular to the longitudinal axis. The cross-section of surface conforming springs is generally either the same through all of the sectional planes of the surface conforming springs or the same at sectional planes which are spaced at repeating intervals along the longitudinal axis of the surface conforming spring. Surface conforming springs that have such a constant or repeating cross-section generally have a relatively constant stiffness against bending along the longitudinal axis of the surface conforming spring. Most surface conforming springs are constructed such that the longitudinal axis is straight when the surface conforming spring is in its free state. One of the most common types of surface conforming springs of the prior art, which is shown in FIG. 1, is constructed of wire which is woven laterally within a single plane along the longitudinal axis of the surface conforming spring. Such a spring has a constant stiffness in all respects from a first end of the spring to a second end of the spring.

Most surface conforming springs are maintained against the spring conformance surface in the same, simple manner. The first end of the surface conforming spring is engaged to a first mounting point adjacent the spring conformance surface and the second end of the spring is engaged to a second mounting point adjacent the spring conformance surface. An inter-mounting point line is a straight line between the first mounting point and the second mounting point. The length of the inter-mounting point line is generally less than a spring free length which is the length of the surface conforming spring in its free state. An inter-mounting point curve is defined by the intersection of a plane, in which the surface conforming spring is generally disposed when the surface conforming spring is engaged to the first mounting point and the second mounting point, and the spring conformance surface. When the surface conforming spring is mounted to the first mounting point and the second mounting point adjacent a concave spring conformance surface, the surface conforming spring bows away from the inter-mounting point line toward the spring conformance surface. For spring conformance surfaces that are concave, the length of the inter-mounting point curve is generally equal to or less than the spring free length. This is so that, when the surface conforming spring is mounted the surface conforming spring will expand against and closely conform to all portions of the spring conformance surface including those portions which have a small radii of curvature. For spring conformance surfaces that are convex the length of the inter-mounting point curve is generally equal to or greater than the spring free length. This is so that, when the surface conforming spring is mounted the surface conforming spring will be drawn against and closely conform to all portions of the spring conformance surface. As was mentioned above, most surface conforming springs of the prior art were constructed such that they had a relatively constant stiffness along the entire length of the longitudinal axis of the spring. The stiffness that the surface conforming springs could have was also limited by a number of factors. These factors include but are not limited to the ability of a person to elastically deform the spring during mounting and the amount of pressure which the surface conforming spring could exert on the spring conformance surface without damaging the spring conformance surface.

The limits that were imposed upon the stiffness of the surface conforming spring effected the performance of the surface conforming springs within their intended function. Surface conforming springs as described above are generally used to hold objects between the surface conforming spring and the spring conformance surface. An example of this is shown in FIG. 1, which is an exploded view of an assembly for holding sound insulation to the underside of a hood of a vehicle. The surface conforming spring of FIG. 1 is intended to hold the sound insulation to the underside of the hood. As is the case with many such systems, in which a surface conforming spring is employed to hold an object against a spring conformance surface, the surface conforming spring is of a constant and limited stiffness. Because of its limited stiffness the surface conforming spring shown in FIG. 1 is prone to bowing away from the spring conformance surface due to the pressure exerted on the surface conforming spring by the sound insulation. The assembly for holding the sound insulation to the underside of the hood must, therefore, include structure other than the surface conforming spring to aid in holding the sound insulation against the underside of the hood. Such difficulties are common with assemblies that utilize surface conforming springs that are of a constant stiffness that must be limited by the factors described above.

SUMMARY OF INVENTION

In view of the above mentioned constraints it is an object of the present invention to provide a surface conforming spring and a mounting structure therefore that is stiff enough to firmly hold an object against a spring conformance surface. It is a further object that the surface conforming spring of the present invention conforms closely to all portions of the spring conformance surface along an inter-mounting point curve. Finally it is an object of the present invention that the surface conforming spring is relatively easy to mount and that it does not exert excessive pressure on the spring conformance surface.

The above mentioned objects of the invention as well as others not mentioned are satisfied as follows. The present invention is a surface conforming spring that has variable stiffness along a longitudinal axis of the surface conforming spring. The surface conforming spring is constructed such that some portions of the surface conforming spring are stiffer against bending along the longitudinal axis than other portions. The surface conforming spring is constructed such that portions of the surface conforming spring which will be adjacent portions of the spring conformance surface that have relatively large radii of curvature have a relatively high stiffness against bending. The surface conforming spring is also constructed such that portions of the surface conforming spring which will be adjacent portions of the spring conformance surface which have a relatively small radius of curvature have a relatively low stiffness against bending. The surface conforming spring described above will readily conform closely to the spring conformance surface and will be stiff enough against bending at those portions where the spring conformance surface has a large radius of curvature to firmly hold objects against the spring conformance surface.

The surface conforming spring and the mounting assembly therefor are also constructed such that the surface conforming spring can be easily mounted. The surface conforming spring has at each end a mounting engagement structure for engagement to one of the mounting points disposed adjacent the spring conformance surface. Each complimentary pair of a mounting point and a mounting engagement structure may be comprised of one female mounting member and one male mounting member. To mount the surface conforming spring an installer must simply elastically deform the surface conforming spring into a shape similar to that which it assumes when mounted and engage the mounting engagement structures of the surface conforming spring to the mounting points. The internal forces and bending moments present in the surface conforming spring then help maintain it in its installed position. Thus, it can be seen that the present invention meets the objects outlined above as well as others not mentioned.

DRAWINGS

Other objects and advantages of the invention will become more apparent upon perusal of the detailed description thereof and upon inspection of the drawings in which:

FIG. 3 is a side view of a surface conforming spring, according to the present invention, in its free state.

FIG. 4 is a plan view of a surface conforming spring, according to the present invention, in its free state.

DETAILS OF INVENTION

Figure 1:
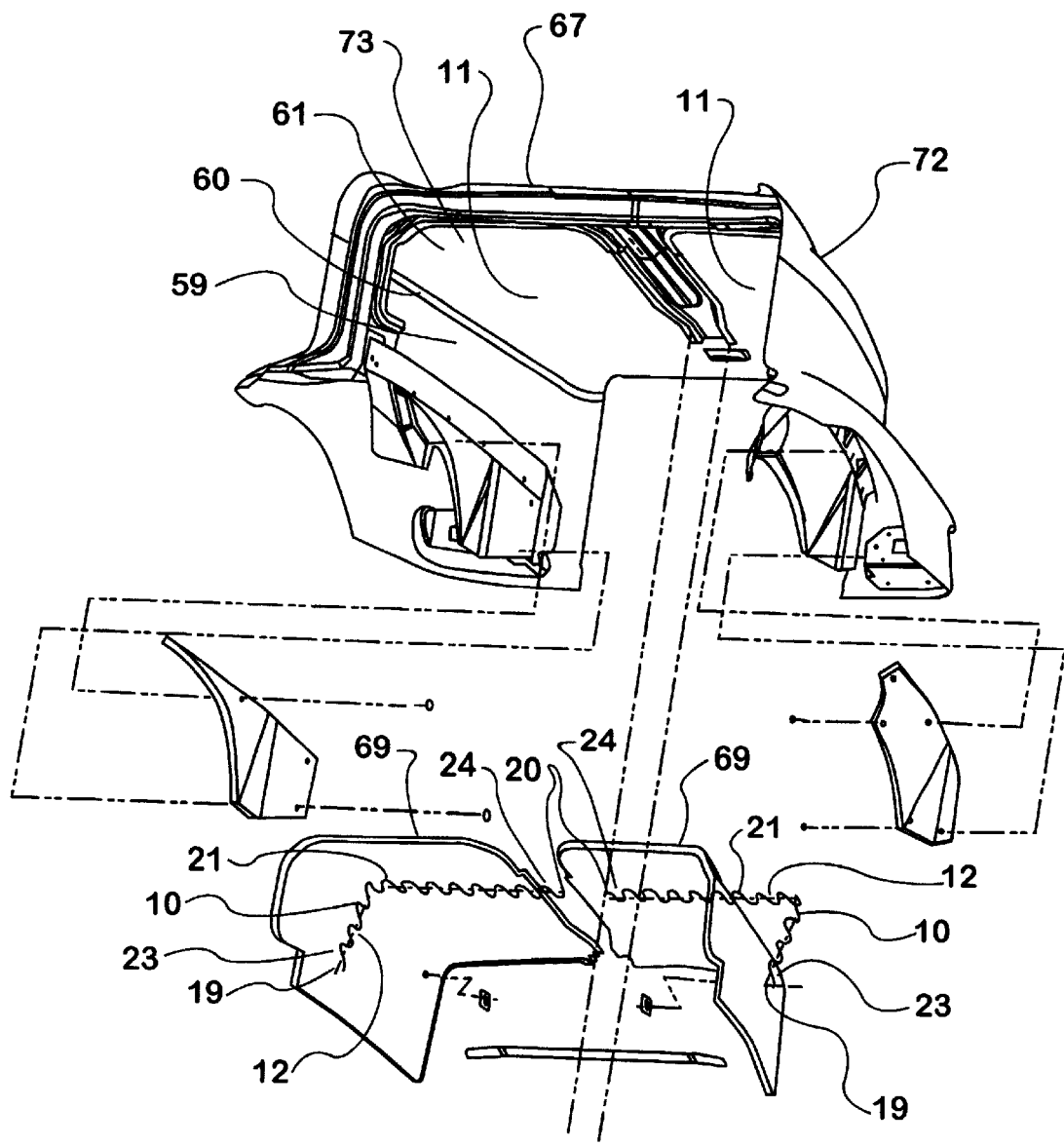
FIG. 1 is a perspective view of the underside of an engine compartment hood and a prior art sound insulation retention system in exploded form.
Figure 2:
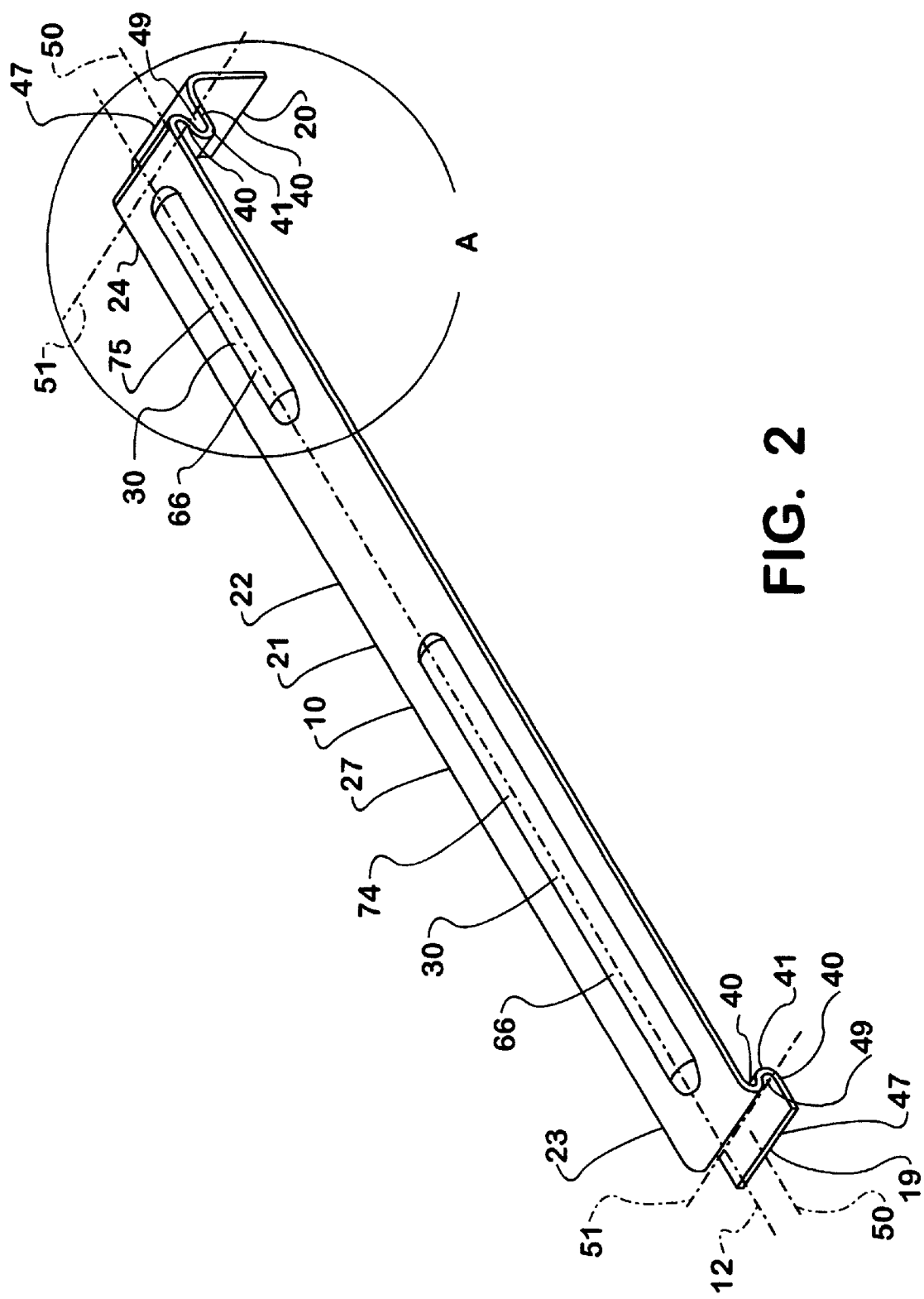
FIG. 2 is a perspective view of a surface conforming spring, according to the present invention, in its free state.
Figure 5:
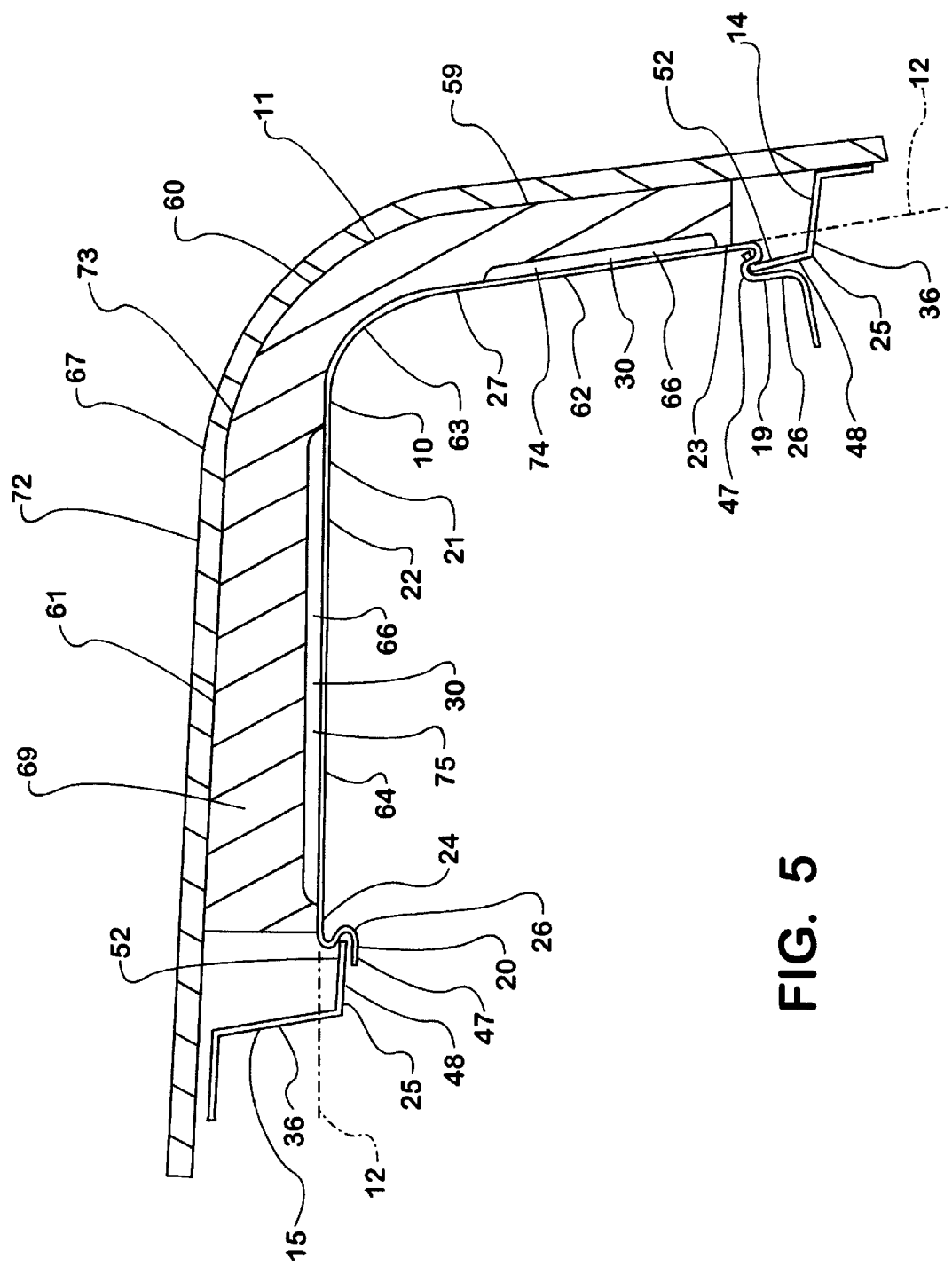
FIG. 5 is a sectional view of an engine compartment hood, with a surface conforming spring mounted adjacent the underside of the hood.
Figure 6:
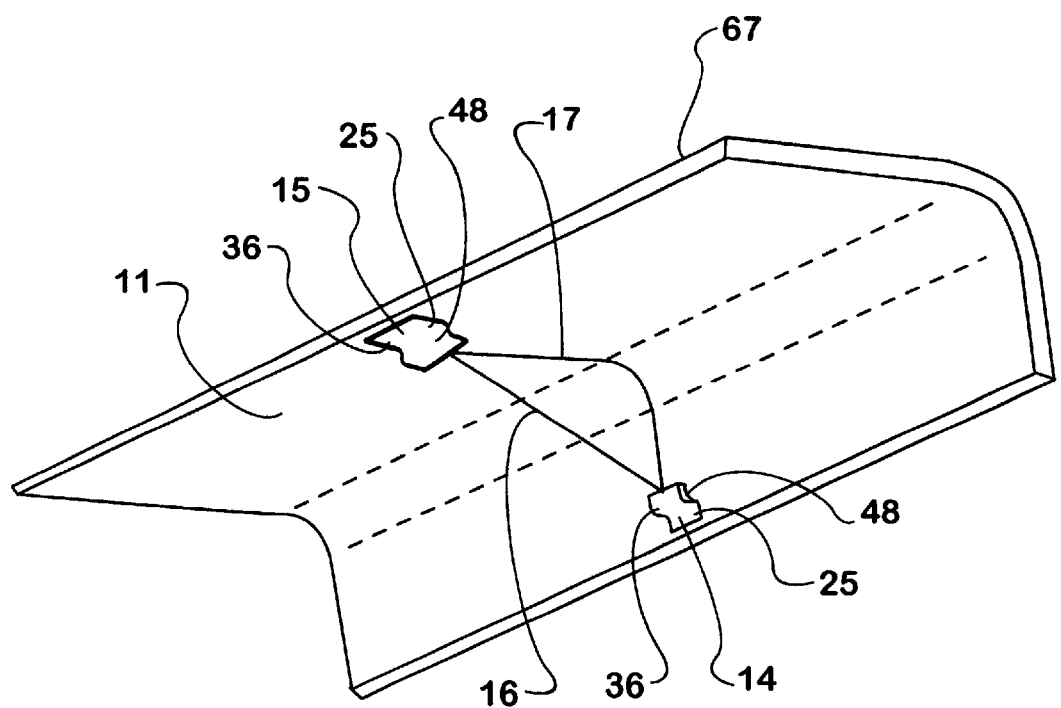
FIG. 6 is a perspective view of a concave spring conformance surface.
Figure 7:
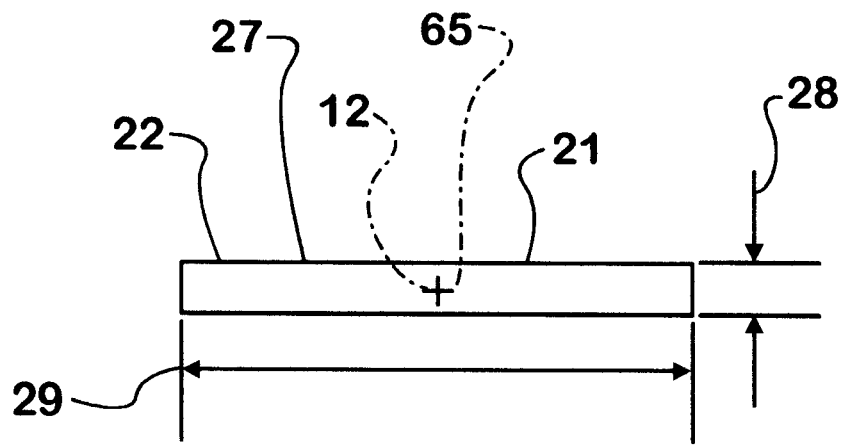
FIG. 7 is a sectional view through section line 7—7 of FIG. 3.

The present invention is a surface conforming spring 10. The surface conforming spring 10 is designed to be mounted adjacent a spring conformance surface 11 which is defined by a spring conformance component 67. The spring conformance surface 11 is a surface that is either concave or convex. The spring conformance surface 11 may have widely varying radii of curvature over the portion of the spring conformance surface 11 adjacent, which the surface conforming spring 10 is to be disposed. The surface conforming spring 10 has a spring body 21 disposed along a longitudinal axis 12 of the surface conforming spring 10. The surface conforming spring 10 may be constructed such that the longitudinal axis 12 may be a curve of virtually any shape when the surface conforming spring 10 is in its free state. In the preferred embodiment, the surface conforming spring 10 is constructed such that the longitudinal axis 12 of the surface conforming spring 10 is a straight line when the surface conforming spring 10 is in its free state. The spring body 21 may be of many different structural designs. The spring body 21 may be comprised of a wire, coiled or woven around or back and forth across the longitudinal axis 12. Such a spring body 21, which is shown in FIG. 1, is hereinafter referred to as a wire-form spring body. In the preferred embodiment, the spring body 21 is comprised of a spring member 22 that extends continuously along the longitudinal axis 12 from a first end 23 to a second end 24 of the surface conforming spring 10. Such a spring body 21, which is shown in FIG. 2, is hereinafter referred to as a member type spring body 21. The spring member 22 may have cross-sections of many different shapes and dimensions at different points along the longitudinal axis 12 of the surface conforming spring 10.

When the surface conforming spring 10 is mounted adjacent the spring conformance surface 11, it is intended to be elastically deformed such that it is maintained in a stable manner against the spring conformance surface 11 along a substantial portion of the length of the surface conforming spring 10. Mounting points 25 to which the surface conforming spring 10 are intended to be mounted, are present adjacent the spring conformance surface 11. The structure for mounting the surface conforming spring 10 adjacent the spring conformance surface 11 includes a first mounting point 14 and a second mounting point 15. Mounting engagement structures 26 are present at the ends of the surface conforming spring 10. A first mounting engagement structure 19, for engagement to the first mounting point 14, is disposed at the first end 23 of the surface conforming spring 10. A second mounting engagement structure 20, for engagement to the second mounting point 15, is disposed at the second end 24 of the surface conforming spring 10. The structure of the mounting points 25 and the mounting engagement structures 26, may of many different well known forms which will ensure that the surface conforming spring 10 will be maintained adjacent the spring conformance structure 11 in a stable manner. The construction of the mounting points 25 and the mounting engagement structures 26 must be such that, when the surface conforming spring is mounted, the ends of the surface conforming spring 10 are prevented from translating relative to the mounting points 25. The translation of the ends in each direction may be prevented by positive abutment of components, by tangential frictional engagement between components, or by forces exerted on the mounting components by the spring body 21. The preferred construction of these components will be discussed in greater detail below.

The positioning of the mounting points 25 is important, because it affects how well the surface conforming spring 10 conforms to the spring conformance surface 11. The first mounting point 14 and the second mounting point 15 are disposed adjacent the spring conformance surface 11. Each respective one of the mounting points 25 is disposed where a respective end of the surface conforming spring 10 is intended to be disposed when it is mounted. A straight line between the first mounting point 14 and the second mounting point 15 is an inter-mounting point line 16. A length of the longitudinal axis 12 of the surface conforming spring 10, when the surface conforming spring 10 is in its free state, is a spring free length 18. The first mounting point 14 and the second mounting point 15 must be positioned such that a length of the inter-mounting point line 16 is less than the spring free length 18. Thus, when a surface conforming spring 10 is mounted adjacent a spring conformance surface 11 that is concave, the spring body 21 bows away from the inter-mounting point line 16 toward the spring conformance surface 11. In the case of a spring conformance surface 11 that is convex the inter-mounting point line 16 is disposed on a side of the spring conformance surface 11 opposite the surface conforming spring 10. Thus, when a surface conforming spring 10 is mounted adjacent such a convex spring conformance surface 11 the longitudinal axis 12 of the surface conforming spring 10 is prevented from coinciding with the inter-mounting point line 16. An intersection of the spring conformance surface 11, and a plane in which the surface conforming spring 10 is to be disposed when mounted, defines an inter-mounting point curve 17 between the first mounting point 14 and the second mounting point 15. The length of the inter-mounting point curve 17, which is determined by the location of the mounting points 25, effects how well the surface conforming spring 10 will conform to the spring conformance surface 11. For a convex spring conformance surface 11 the mounting points 25 are generally positioned such that the inter-mounting point curve 17 has a length approximately equal to or greater than the spring free length 18. With the mounting points 25 so positioned adjacent a convex spring conformance surface 11, the surface conforming spring 10 will be drawn toward the spring conformance surface 11 when mounted adjacent the spring conformance surface 11. For a concave spring conformance surface 11 the mounting points 25 are generally positioned such that the inter-mounting point curve 17 has a length less than or approximately equal to the spring free length 18. With the mounting points 25 so positioned adjacent a concave spring conformance surface 11, the surface conforming spring 10 will bow toward and conform closely to most portions of the concave spring conformance surface 11. For surface conforming springs 10 that have a member type spring body 21, which is generally not compressible along the longitudinal axis 12, the inter-mounting point curve 17 should be of a length approximately equal to the spring free length 18. In all cases, the length of the inter-mounting point curve 17 may need to vary slightly from the guidelines outlined above in order to allow space for objects between the surface conforming spring 10 and the spring conformance surface 11.

The spring body 21 is preferably constructed such that the surface conforming spring 10 has varying stiffness against bending along its longitudinal axis 12. A wire-form spring body 21 may be constructed with varying distances between coils of the wire along the longitudinal axis 12 and/or varying diameters or widths of coils perpendicular to the longitudinal axis 12. A member type spring body 21 may be constructed of a spring member 22 that has different cross-sectional shapes and/or sizes at different cross-sections along the longitudinal axis 12. The stiffness against bending of a portion of the spring member 22 is proportional to the magnitude of the section modulus of the cross-sections of that portion of the spring member 22. The magnitude of the section modulus of a cross-section of a portion of the spring member 22 increases as the width 29 of the respective portion of the spring member 22 increases. The width 29 of the spring member 22 is disposed perpendicular to the longitudinal axis 12 of the spring body 21 and parallel to the spring conformance surface 11 when the surface conforming spring 10 is mounted adjacent the spring conformance surface 11. The neutral axis 65 of the spring member 22 is an axis which is disposed at points in space where there is no stress in the spring member 22 when the spring member 22 is bent along the neutral axis 65. The section modulus and the stiffness against bending of a cross-section of the spring member 22 increases as more of the material of the spring member 22 at the respective cross-section is offset from the neutral axis 65 in directions perpendicular to the width 29 of the spring member 22. The section modulus and the stiffness against bending of a cross-section of the spring member 22 also increases as the material of the spring member 22 which is offset is from the neutral axis 65 is offset farther from the neutral axis 65. Innumerable combinations of shape and size of various cross-sections of the spring member 22 could be employed which would provide for variable stiffness of the surface conforming spring 10 along its longitudinal axis 12.

Figure 8:
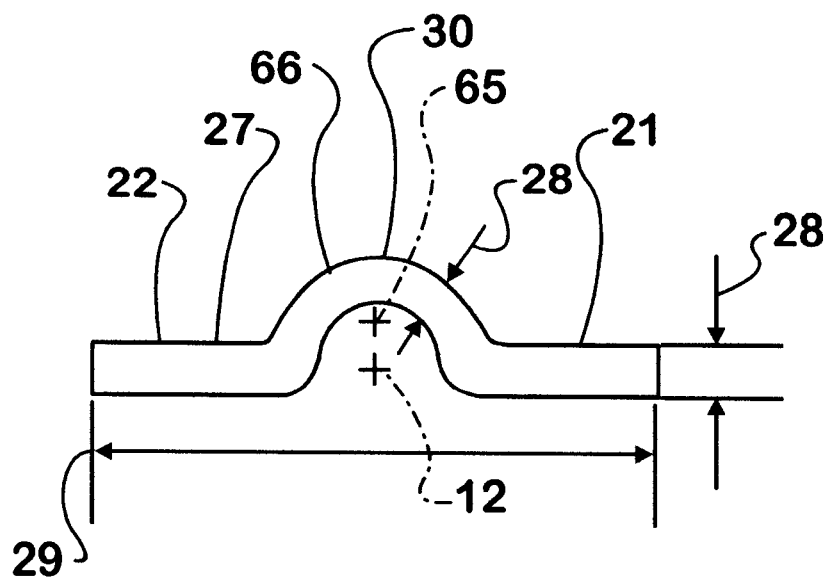
FIG. 8 is a sectional view through section line 8—8 of FIG. 3.

As was mentioned above the spring body 21 is preferably constructed of a spring member 22. The preferred embodiment of the spring member 22, which is depicted in FIGS. 2, 3, 4, 5, 7, and 8, is a sheet 27. A thickness 28 of the sheet 27 is preferably uniform throughout the sheet 27. In order to effect varied stiffness of the spring body 21 along the longitudinal axis 12, the form of the sheet 27 may vary in a number of ways along the longitudinal axis 12 of the spring body 21 which effect the magnitude of the section modulus. The width 29 of the sheet may vary along the longitudinal axis 12 with wider portions of the sheet 27 being stiffer against bending than narrower portions of the sheet 27. The shape of cross-sections of the sheet 27 perpendicular to the longitudinal axis 12 may also vary along the longitudinal axis 12 of the sheet 27. The sheet 27 preferably forms stiffening features 66 such as ribs 30 and/or flanges that are offset from the neutral axis 65 in directions perpendicular to the width 29 of the sheet 27 and which extend in directions parallel to the longitudinal axis 12. Those portions of the sheet 27 that have ribs 30 and/or flanges are stiffened against bending along the neutral axis 65 by the ribs 30 and/or flanges. Stiffness against bending for a respective portion of the sheet 27 increases with increasing numbers and/or sectional size of stiffening features 66 disposed in the respective portion of the sheet 27. The sectional size of the stiffening features 66 of the sheet 27 may vary continuously, or in a substantially stepped manner. Portions of the sheet 27 may have multiple stiffening features 66 disposed parallel to one another. Other portions of the sheet 27 may lack stiffening features 66. As is best shown in FIGS. 3 and 8, the stiffening features 66 of the preferred embodiment are ribs 30 that extend parallel to the longitudinal axis 12 of the sheet 27.

As was mentioned above, the mounting engagement structures 26 and the mounting points 25 of the present invention may take on many forms which, in combination with any intended engagement of the surface conforming spring 10 to other structure, secures the surface conforming spring 10 in its intended position. One or more complimentary pairings of a mounting point 25 and a mounting engagement structure 26 which is to be engaged to the mounting point 25, may be comprised of a female mounting element 47 and a male mounting element 48. The mounting engagement structure 26, which is disposed at an end of the spring body 21, may be comprised of either the female mounting element 47 or the male mounting element 48. Whichever of the female mounting element 47 and the male mounting element 48 the mounting engagement structure 26 is comprised of, would be fixedly engaged to an end of the spring body 21. A complimentary mounting point 25, must be comprised of whichever of the female mounting element 47 and the male mounting element 48 that the mounting engagement structure 26 is not comprised of. The female mounting member 47 defines a mounting recess 49 in which the male mounting member 48 is to be disposed when the female mounting member 47 is engaged to the male mounting member 48. An insertion axis 50 within the mounting recess 49 of the female mounting element 47 is oriented in a direction in which the male mounting element 48 is moved as it is inserted into the mounting recess 49. The mounting recess 49 of the female mounting member 47 and the male mounting member 48 may be of many different shapes and sizes. The female mounting member 47 and the male mounting member 48 are preferably constructed such that a person can engage the male mounting member 48 to the female mounting member by simply inserting the male mounting member 48 into the mounting recess 49. Preferably, the male mounting member 48 and the female mounting member 47 are constructed such that, when the two components are engaged, rotation of the male mounting member 48 relative to the female mounting member 48 is prevented about a mounting moment support axis 51. The mounting moment support axis 51 is preferably, but not necessarily, disposed perpendicular to the insertion axis 50 of the mounting recess 49. Thus the internal bending moment which is present in the surface conforming spring 10 when it is mounted may be transferred through the female mounting member 47 and the male mounting member 48 to the spring conformance component 67. All of the components are preferably constructed such that, when the surface conforming spring 10 is properly mounted, the mounting moment support axis 51 is oriented parallel to the spring conformance surface 11 and perpendicular to the longitudinal axis 12 of the surface conforming spring 10. In the preferred embodiment each complimentary pairing of a mounting point 25 and a mounting engagement structures 26 is comprised of a female mounting member 47 and a male mounting member 48 as described above. One skilled in the art could easily imagine complimentary female mounting members 47 and male mounting members 48 of innumerable forms that would satisfy the functional requirements of the components.

Figure 9:
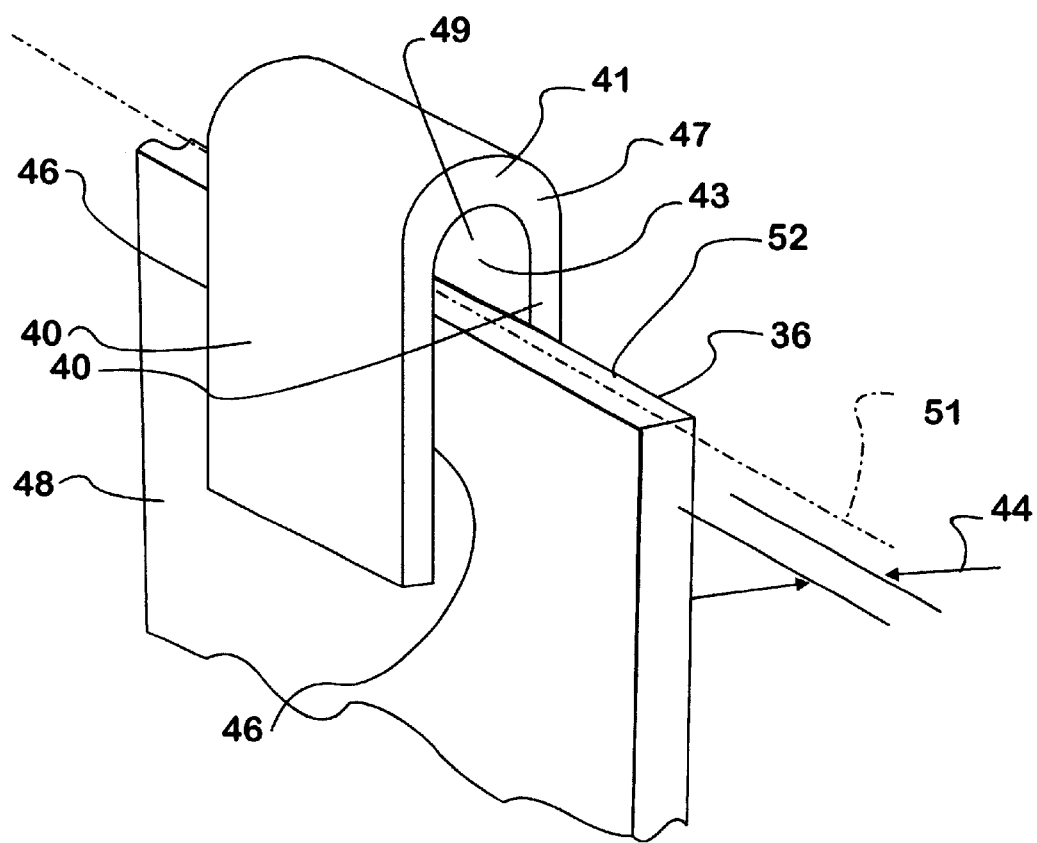
FIG. 9 is a perspective view of a first embodiment of a female mounting member engaged to a male mounting member.
Figure 10:
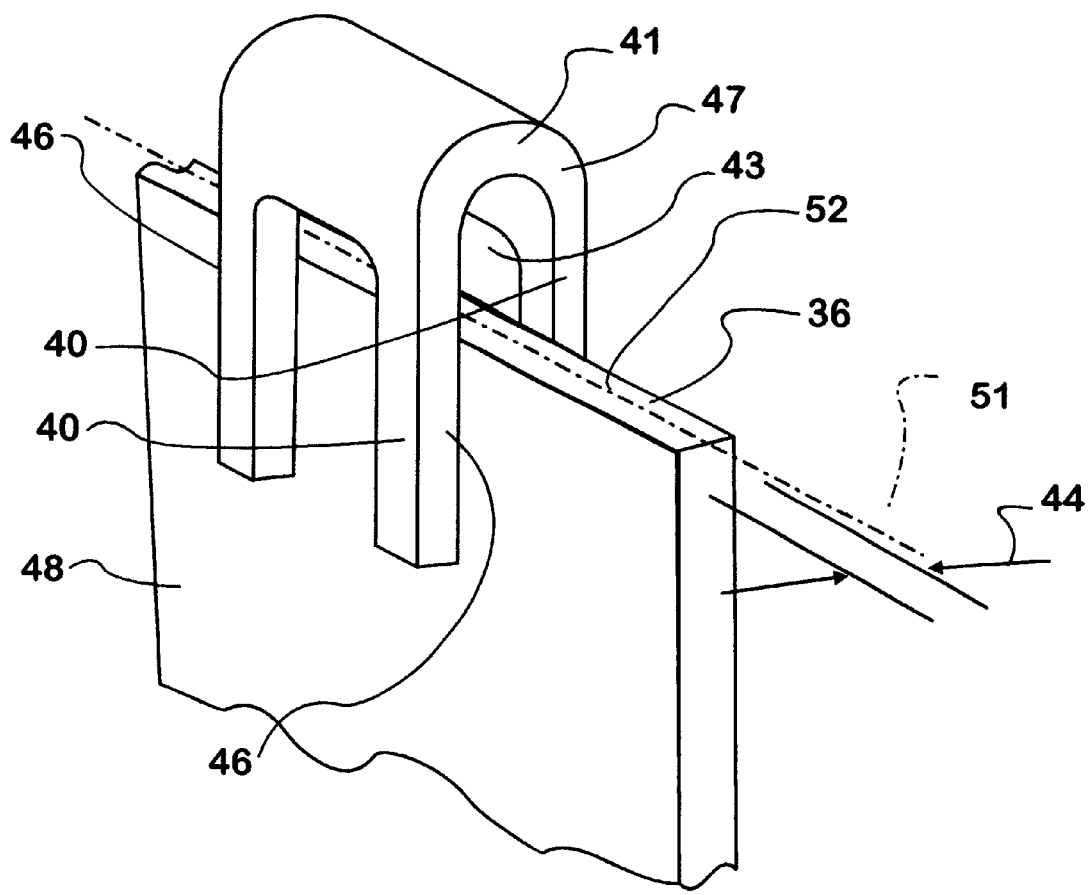
FIG. 10 is a perspective view of a second embodiment of a female mounting member engaged to a male mounting member.

In one particular embodiment one or more complimentary pairings of a mounting engagement structure 26 and a mounting point 25 are comprised of at least two mounting tines 40 and a mounting plate 36. A female mounting member 47 is comprised of the at least two mounting tines 40 and a complimentary male mounting member 48 is comprised of the mounting plate 36. The at least two mounting tines 40 of the female mounting member 47 would be fixedly engaged to either an end of the spring body 21 or the spring conformance component 67. The mounting plate 36 which is designed to be engaged to the at least two mounting tines 40 is fixedly engaged directly or indirectly to whichever of the end of the spring body 21 and the spring conformance component 67 the at least two mounting tines 40 are not engaged to. At least two of the at least two mounting tines 40 are parallel mounting tines 79 which are disposed substantially parallel to one another in a rigid manner and the mounting recess 49 of the female mounting member 47 is defined between the parallel mounting tines 79. A mounting recess width 43 between the parallel mounting tines 79 is slightly greater than a plate thickness 44 of the mounting plate 36. When the surface conforming spring 10 is mounted, the mounting plate 36 is received within the mounting recess 49 defined between the parallel mounting tines 79. The at least two mounting tines 40 and the mounting plate 36 must be engaged to the spring body 21 and the spring conformance component 67 in an orientation such that the internal moment present in the surface conforming spring 10, when mounted, is transferred to the spring conformance component 67. The mounting plate 36 must be engaged to the other components in an orientation such that the mounting moment support axis 51 of each complimentary pairing of a mounting engagement structure 26 and a mounting point 25 is oriented as described above. When the surface conforming spring 10 is mounted, the mounting plate 36 should be oriented such that the plate thickness 44 is oriented in any direction other than one that is both parallel to the spring conformance surface 11 and perpendicular to the longitudinal axis 12 of the spring body 21. This orientation of the mounting plate 36 ensures that the internal moment present in the surface conforming spring 10 will be transferred through the at least two mounting tines 40 and the mounting plate 36 to the spring conformance component 67. Preferably, a bridge 41 is fixedly engaged to the at least two mounting tines 40. The bridge 41 would be fixedly engaged to an end of each of the at least two mounting tines 40 that would extend in a substantially common direction from the bridge 41. The bridge 41 spans one end of the mounting recess 49 such that if a mounting plate 36 is inserted far enough into the mounting recess 49 a free end 52 of the mounting plate 36 will abut the bridge 41. It is preferred that on at least one side of the mounting plate 36 outer contact points 46 between mounting tines 40, disposed on that side of the mounting plate 36, and the mounting plate 36, be separated by a considerable distance. This separation between outer contact points 46 can be accomplished in two ways. As is shown in FIG. 9 a single mounting tine 40 of considerable width may be present on at least one side of the mounting plate 36. Alternatively, two or more mounting tines 40 which are disposed on one side of the mounting plate 36 may be separated by a considerable distance, as is shown in FIG. 10. Such an arrangement prevents the mounting plate 36 from moving relative to the female mounting member 47 in all degrees other than translation perpendicular to the plate thickness 44 of the mounting plate 36 and rotation about any axis parallel to the plate thickness 44. The internal bending moment which is present in the surface conforming spring 10 when it is mounted would cause the mounting plate 36 to be urged against the mounting tines 40. The resulting tangential frictional engagement between the mounting plate 36 and the mounting tines 40 would tend to prevent any relative motion which would not otherwise be positively prevented by the engagement of the mounting plate 36 to the mounting tines 40.

In the preferred embodiment, each of the female mounting members 47 is an integral extension of an end of the spring body 21. In this embodiment a spring body engagement end 53 of a spring body engagement tine 54 of each female mounting member 47 is fixedly engaged to an end of said spring body 21. A bridge engagement end 55 of the spring body engagement tine 54 of each female mounting member 47 is fixedly engaged to a first end 56 of a bridge 41 of each female mounting member 47. A second end 57 of the bridge 41 of each female mounting member 47 is fixedly engaged to a bridge engagement end 55 of an outer mounting tine 58 of each female mounting member 47. The bridge 41 preferably extends from the spring body engagement tine 54 away from the spring body 21 such that the outer mounting tine 58 is further from the spring body 21 than the spring body engagement tine 54. The spring body engagement tine 54, the bridge 41, and the outer mounting tine 58, are all preferably formed of the same sheet 27 which preferably forms the spring body 21.

Figure 11:
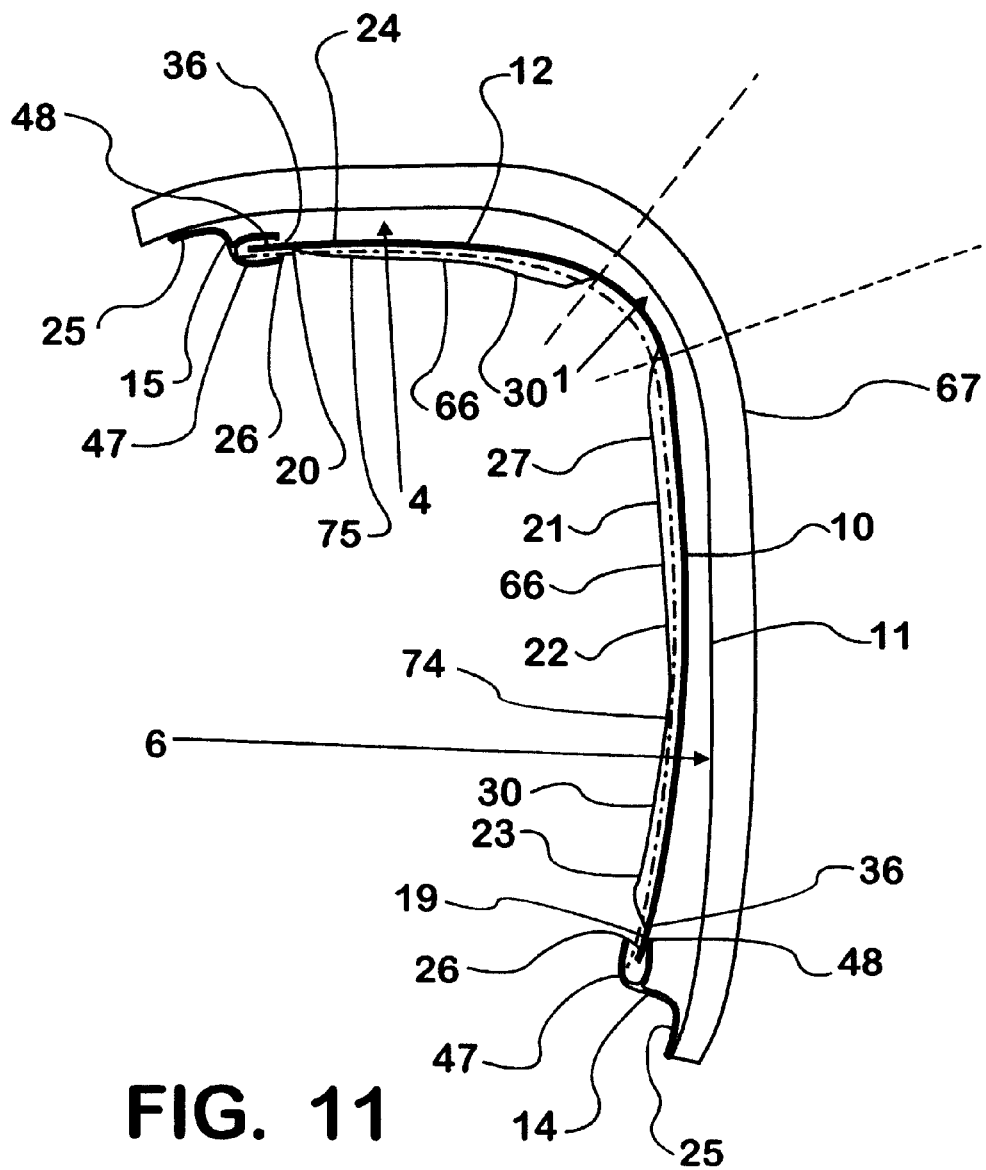
FIG. 11 is a sectional view of a surface conforming spring of the present invention adjacent a spring conformance component.
Figure 12:
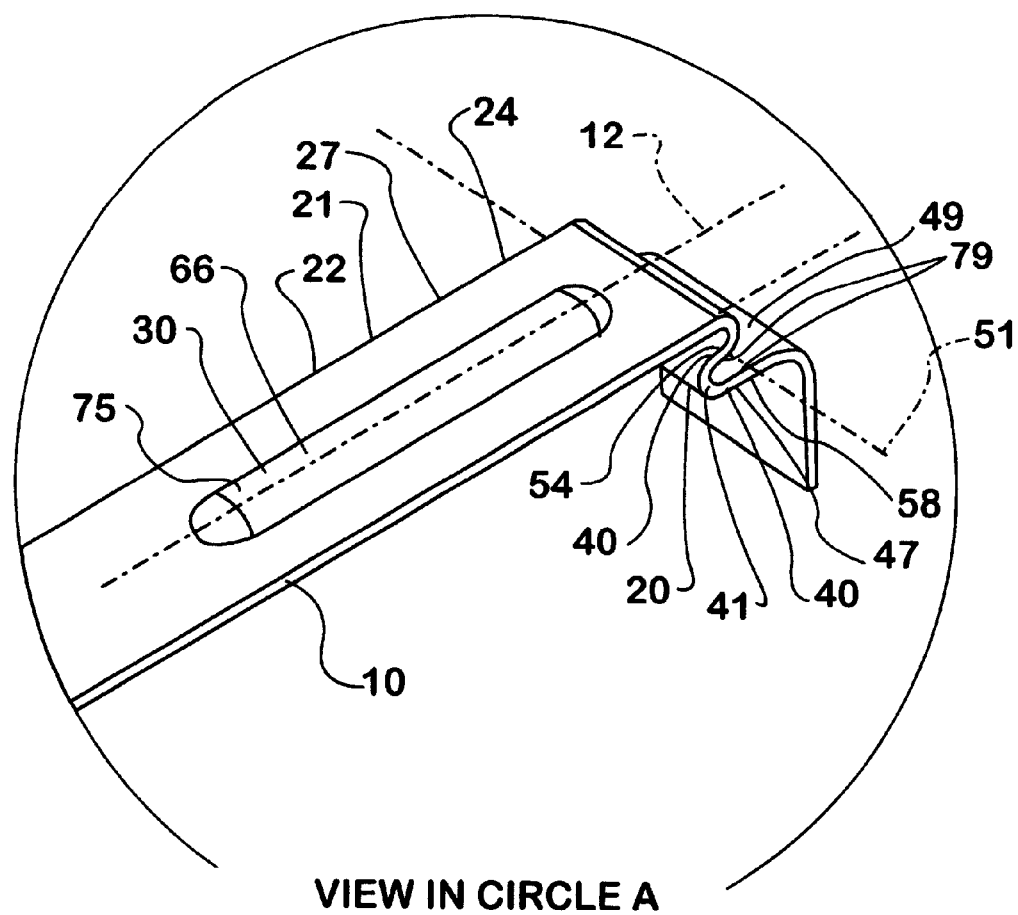
FIG. 12 is a detailed view of the portion of FIG. 2 that is contained within circle A.
Figure 13:
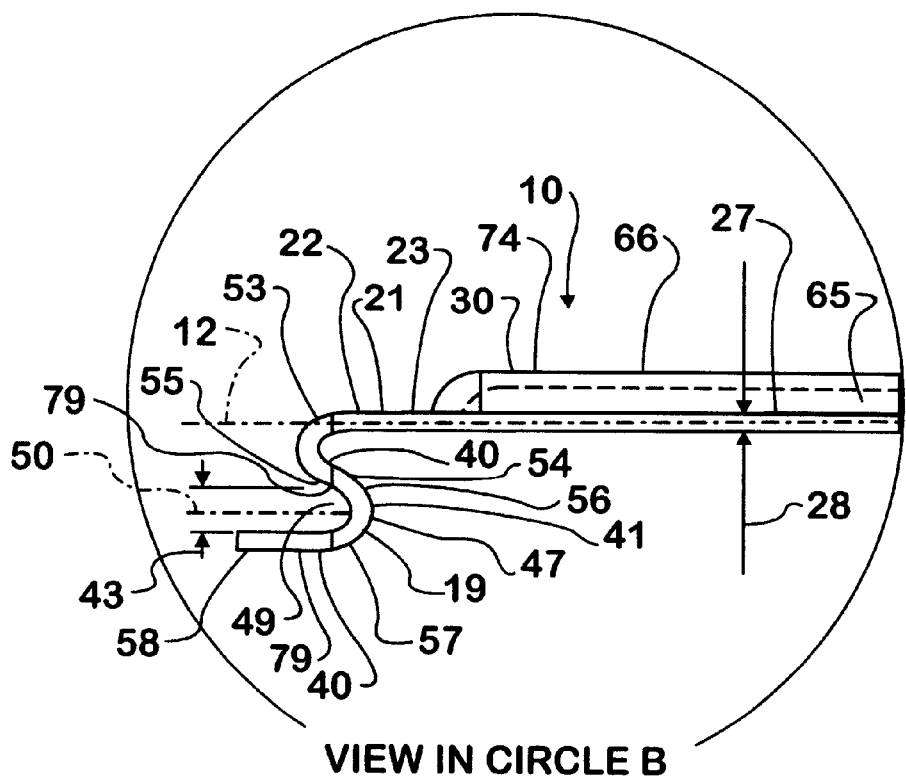
FIG. 13 is a detailed view of the portion of FIG. 3 that is contained within circle B.
Figure 14:
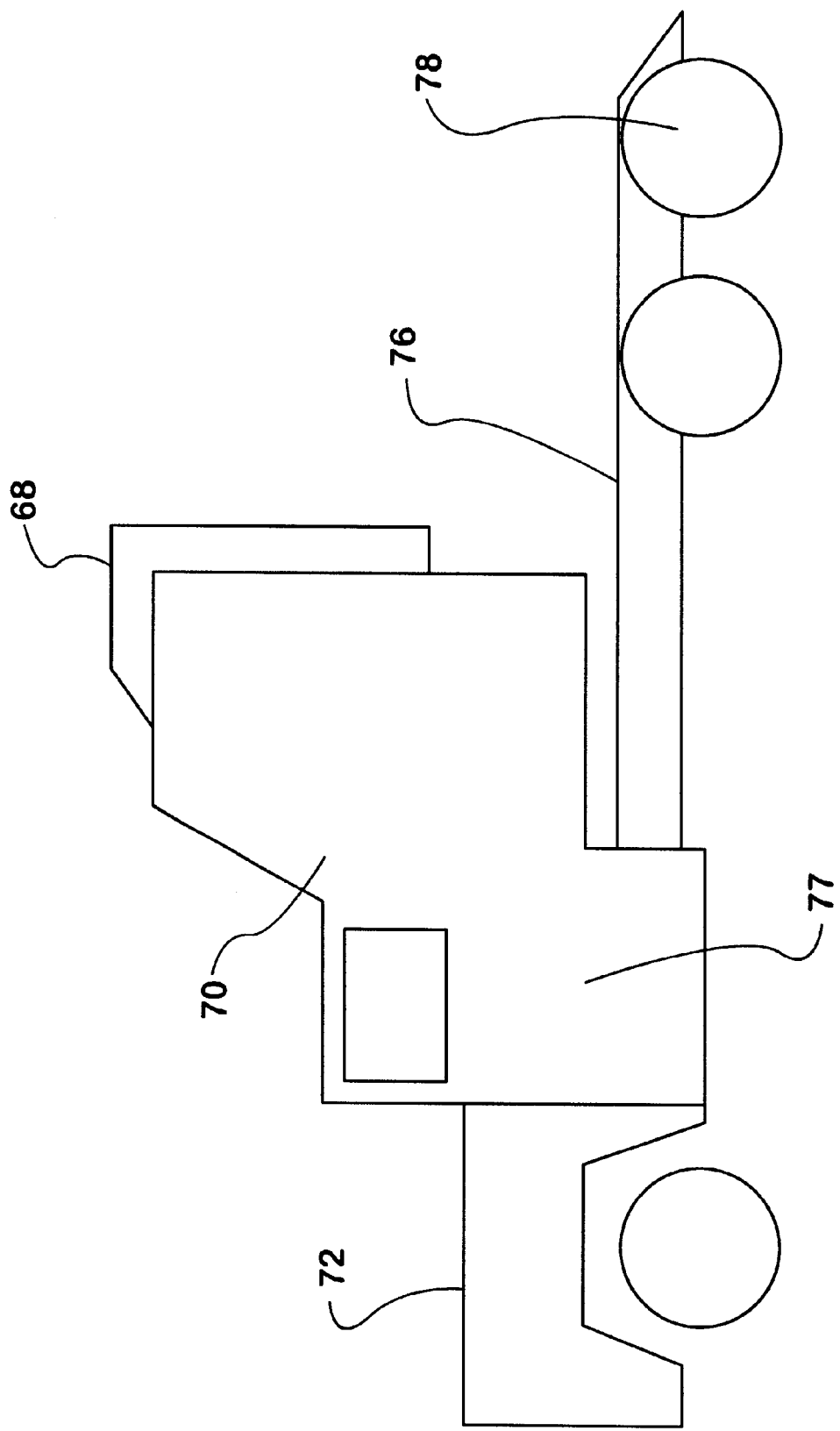
FIG. 14 is a side view of a vehicle that is comprised of a spring conformance component and a surface conforming spring according to the present invention.

The surface conforming spring 10 may be designed so that the stiffness against bending of various portions of the spring body 21 allows the spring to very closely conform to the spring conformance surface 11. The stiffness against bending of a first portion of the spring body 21 would have a magnitude that is a certain percentage of the magnitude of a stiffness against bending of a second portion of the spring body 21. A first portion of the spring conformance surface 11, which the first portion of the spring body 21 is to be disposed adjacent, has a first radius of curvature. A second portion of the spring conformance surface 11, which the second portion of the spring body 21 is to be disposed adjacent, has a second radius of curvature. Preferably the ratio of the radius of curvature of the first portion of the spring conformance surface 11 to the radius of curvature of the second portion of the spring conformance surface 11 is similar to the ratio of the stiffness against bending of the first portion of the spring body 21 to the stiffness against bending of the second portion of the spring body 21. In fact, the magnitude of the stiffness against bending of each respective portion of the entire spring body 21 as compared to all other portions of the spring body 21 would preferably be similar to the radius of curvature of the respective portion of the spring conformance surface 11 adjacent which each portion of the spring body 21 is to be disposed as compared to the radii of curvature of all other portions of the spring conformance surface 11. One possible example of a surface conforming spring 10 that is tailored to the spring conformance surface 11 in such a manner is shown in FIG. 11. The spring conformance surface 11 shown in FIG. 11 has three portions, each of which has a different radius of curvature. The side portion 59 of the spring conformance surface 11 shown in FIG. 11 has a radius of curvature of 6 units. The corner portion 60 of the spring conformance surface 11 shown in FIG. 11 has a radius of curvature of 1 unit. The upper portion 61 of the spring conformance surface 11 shown in FIG. 11 has a radius of curvature of 4. The spring body 21 shown in FIG. 11 has a side disposed portion 62, a corner disposed portion 63, and an upper disposed portion 64 which are disposed adjacent the three respective similarly named portions of the spring conformance surface 11 of FIG. 11. The side disposed portion 62 of the spring body 21 shown in FIG. 11 has a stiffness against bending which is approximately 6 times the magnitude of the stiffness against bending of the corner disposed portion 63 of the spring body 21. This ratio of stiffness against bending of the side disposed portion 62 to the corner disposed portion 63 is the same as the ratio of the radius of curvature of the two portions of the spring conformance surface 11 adjacent which the respective portions of the spring body 21 are disposed. The upper disposed portion 64 of the spring body 21 shown in FIG. 11 has a stiffness against bending which is approximately 4 times the magnitude of the stiffness against bending of the corner disposed portion 63 of the spring body 21. This ratio of stiffness against bending of the upper disposed portion 64 to the corner disposed portion 63 is the same as the ratio of the radius of curvature of the two portions of the spring conformance surface 11 adjacent which the respective portions of the spring body 21 are disposed. Thus, when the surface conforming spring 10 is mounted, each of the portions of the surface conforming spring 10 will readily assume a radius of curvature similar to the radius of curvature of a portion of the spring conformance surface 11 adjacent which they will be mounted. The example given in FIG. 11 is rather simplified. Obviously few spring conformance surfaces 11 will have large portions with exactly the same radius of curvature. It is contemplated that a portion of a spring body 21 that has a constant stiffness against bending may conform acceptably to a portion of a spring conformance surface 11 which has a radius of curvature with a magnitude that varies within a limited range. It is also contemplated that a spring body 21 may be constructed with a stiffness against bending which varies in a continuous rather than stepped manner if it is desired that the surface conforming spring 10 closely conform to a complex spring conformance surface 11.

In one application the surface conforming spring is employed to hold an object 69 adjacent the spring conformance surface 11 defined by a spring conformance component 67. The spring conformance component 67 may be a component of a vehicle 68. The spring conformance component 67 may specifically be one of the outer body panels 70 of a cabin 77 or a portion of an engine compartment hood 72 of the vehicle 68. The object 69 that is held between the spring conformance surface 11 and the surface conforming spring 10 may be a flexible material such as sound or heat insulation. In one embodiment the surface conforming spring 10 is utilized to hold an object 69 such as sound insulation against a spring conformance surface 11 defined by the engine compartment hood 72 of a vehicle 68. The spring conformance surface 10 would most likely be defined on an underside 73 of the engine compartment hood 72. The spring conformance surface 11 of this embodiment would likely have a side portion 62, a corner portion 63, and an upper portion 61. The side portion 62 of the underside 73 of the engine compartment hood 72 is usually substantially vertical with relatively large radii of curvature. The upper portion 61 of the underside 73 of the engine compartment hood 72 is usually substantially horizontal with relatively large radii of curvature. The corner portion 63 of the underside 73 of the engine compartment hood 72 is disposed between the side portion 62 and the upper portion 61. The corner portion 63 usually has relatively small radii of curvature. The present invention contemplates a surface conforming spring 10 which is well adapted to conform to the underside 73 of such an engine compartment hood 72. A portion of the sheet 27 which is to be disposed adjacent the side portion 62 of the underside 73 of the engine compartment hood 72 defines a first rib 74 which extends in the direction of the longitudinal axis 12 and which stiffens that portion against bending. A portion of the sheet 27 which is to be disposed adjacent the upper portion 61 of the underside 73 of the engine compartment hood 72 defines a second rib 75 which extends in the direction of the longitudinal axis 12 and which stiffens that portion against bending. A portion of the sheet 27 which is to be disposed adjacent the corner portion 63 of the underside 73 of the engine compartment hood 72 lacks stiffening features 66. The increased stiffness caused by the first rib 74 and the second rib 75 helps ensure the spring body will not buckle under the pressure exerted on it by any objects 69 which are disposed between the surface conforming spring 10 and the engine compartment hood 72. The relatively low stiffness of the spring body between the first rib 74 and the second rib 75 ensures that the surface conforming spring 10 can be mounting in a manner closely conforming to the corner portion of the underside 73 of the engine compartment hood 72. The mounting engagement structures 25 disposed at both the first end 23 and the second end 24 are preferably female mounting members 47 which are integral extensions of the sheet 27 of the spring member 22 as described above. Both of the mounting points 26 are preferably mounting plates 36 which are fixedly engaged to the engine compartment hood 72 and disposed adjacent the spring conformance surface 11.

As was mentioned above the spring conformance component 67 may be designed to be a component of a vehicle 68. The vehicle 68 would have a number of other components. The vehicle 68 would have a frame 76. The cabin of the vehicle 68 would be engaged to the frame 76. The cabin 77 of the vehicle 68 is intended to protect cargo and/or occupants from the elements. The vehicle 68 would have a suspension system 78 engaged to the frame 76 for supporting the vehicle 68. The vehicle 68 may also have an engine compartment hood 72 that is engaged to the frame 76 and/or the cabin 77. The cabin 77 and/or the engine compartment hood 72 of the vehicle may be comprised of one or more spring conformance components 67 adjacent which surface conforming springs 10 according to the present invention may be mounted.

Those skilled in the art will appreciate that modifications could be made to the invention as described without departing from the spirit and scope of the invention and thus the scope of the invention is limited only by the following claims.

We claim:

1. A surface conforming spring for mounting adjacent a spring conformance surface which has two or more mounting points disposed adjacent the spring conformance surface one or both of which mounting points may be comprised of a mounting plate which has a plate thickness, comprising:
   (a) a spring body extending along a longitudinal axis of said surface conforming spring;
   (b) at least two mounting engagement structures each of which is disposed at an end of said spring body;
   (c) wherein each of said two mounting engagement structures is designed to be engaged to one of the mounting points;
   (d) wherein said spring body is constructed such that a stiffness of said spring body against bending varies along said longitudinal axis of said spring body;
   (e) wherein portions of said spring body which are designed to be located next to portions of the spring conformance surface which have a relatively large radius of curvature have a relatively high stiffness against bending;
   (f) wherein portions of said spring body which are designed to be located next to portions of the spring conformance surface which have a relatively small radius of curvature have a relatively low stiffness against bending;
   (g) wherein when said surface conforming spring is properly installed, said mounting engagement structures at said ends of said spring body are engaged to the mounting points, and said spring body of said surface conforming spring is disposed relatively close to the spring conformance surface between the mounting points;
   (h) said spring body is comprised of a spring member which extends from one end of said longitudinal axis of said surface conforming spring, along said longitudinal axis of said surface conforming spring, to an opposite end of said longitudinal axis of said surface conforming spring;
   (i) said spring member is constructed such that it has cross-sections of different shape and/or size perpendicular to said longitudinal axis at different points along said longitudinal axis;
   (j) said spring member is comprised of a sheet with substantially uniform thickness throughout; and
   (k) said sheet forms one or more stiffening features which extend parallel to said longitudinal axis and which stiffen said spring body against bending along said longitudinal axis of said spring body.

2. The surface conforming spring of claim 1, wherein:
   (a) one or both of said mounting engagement structures is comprised of a female mounting member which is comprised of at least two mounting tines;
   (b) said at least two mounting tines of each female mounting member are fixedly engaged directly or indirectly to an end of said spring body;
   (c) at least two of said at least two mounting tines of each female mounting member are parallel mounting tines which are disposed substantially parallel to one another such that a mounting recess is defined between said parallel mounting tines;
   (d) said parallel mounting tines of each female mounting member are separated by a distance such that a mounting recess width of said mounting recess is slightly greater than the plate thickness of the respective mounting plate to which said female mounting member is to be engaged; and
   (e) when said surface conforming spring is mounted said mounting recess of each female mounting member receives the respective mounting plate to which said female mounting member is designed to be engaged.

3. The surface conforming spring of claim 2, further comprising:
   (a) one or more bridges each of which is fixedly engaged to one end of each of said at least two mounting tines of a respective female mounting member;
   (b) wherein each of said at least two mounting tines, of said respective female mounting member, extends in a substantially common direction from said bridge.

4. The surface conforming spring of claim 3, wherein:
   (a) one or more of said female mounting members is an integral extension of said spring body;
   (b) a spring body engagement end of a spring body engagement tine of each respective female mounting member that is an integral extension of said spring body is fixedly engaged to an end of said spring body;
   (c) a bridge engagement end of said spring body engagement tine of each respective female mounting member that is an integral extension of said spring body is fixedly engaged to a first end of each respective bridge of each respective female mounting member which is an integral extension of said spring body;
   (d) a second end of each respective bridge of each respective female mounting member that is an integral extension of said spring body is fixedly engaged to a bridge engagement end of an outer mounting tine; and
   (e) each spring body engagement tine and each outer mounting tine of each respective female mounting member that is an integral extension of said spring body extend in a substantially common direction and in a substantially parallel manner from said bridge such that said mounting recess is defined between said spring body engagement tine and said outer mounting tine of each respective female mounting member that is an integral extension of said spring body.

5. The surface conforming spring of claim 4, wherein:
   (a) a first portion of said spring body has a stiffness against bending which is a first stiffness against bending;
   (b) a second portion of said spring body has a stiffness against bending which is a second stiffness against bending;
   (c) a portion of the spring conformance surface, adjacent which said first portion of said spring body is to be disposed when said surface conforming spring is mounted, has a radius of curvature which is a first radius of curvature;
   (d) a portion of the spring conformance surface, adjacent which said second portion of said spring body is to be disposed when said surface conforming spring is mounted, has a radius of curvature which is a second radius of curvature;
   (e) a ratio of said first stiffness against bending to said second stiffness against bending is similar to a ratio of said first radius of curvature to said second radius of curvature;
   (f) when said surface conforming spring is mounted adjacent said spring conformance surface said first portion of said surface conforming spring readily assumes a radius of curvature similar to said first radius of curvature; and
   (g) when said surface conforming spring is mounted adjacent said spring conformance surface said first portion of said surface conforming spring readily assumes a radius of curvature similar to said first radius of curvature.

6. An assembly which may be intended for use as an outer body panel for a cabin or an engine compartment hood of a vehicle, comprising:
   (a) a spring conformance component which defines a spring conformance surface;
   (b) wherein said spring conformance surface is of either a concave or convex nature and different portions of said spring conformance surface may have different radii of curvature;
   (c) mounting points fixedly engaged either directly or indirectly to said spring conformance component and disposed adjacent said spring conformance surface;
   (d) a surface conforming spring engaged to said mounting points and disposed adjacent said spring conformance surface;
   (e) wherein said surface conforming spring is comprised of a spring body extending along a longitudinal axis of said surface conforming spring;
   (f) wherein said surface conforming spring is comprised of two mounting engagement structures;
   (g) wherein each of said two mounting engagement structures are engaged to an end of said spring body;
   (h) wherein each of said two mounting engagement structures is also engaged to one of said mounting points;
   (i) wherein said surface conforming spring is maintained in a stable manner between said mounting points and adjacent said spring conformance surface;
   (j) wherein said spring body is constructed such that a stiffness of said spring body against bending varies along said longitudinal axis of said spring body;
   (k) wherein portions of said spring body which are located next to portions of said spring conformance surface which have relatively large radii of curvature have a relatively high stiffness against bending;
   (l) wherein portions of said spring body which are located next to portions of said spring conformance surface which have relatively small radii of curvature have a relatively low stiffness against bending; and
   (m) wherein said spring conformance component is of a relatively rigid construction such that said spring conformance surface is deformed substantially less from its free state than said surface conforming spring is deformed from its free state.

7. The assembly of claim 6, wherein:
   (a) said spring body is comprised of a spring member which extends from one end of said longitudinal axis of said surface conforming spring, along said longitudinal axis of said surface conforming spring, to an opposite end of said longitudinal axis of said surface conforming spring; and
   (b) said spring member is constructed such that it has cross-sections of different shape and/or size perpendicular to said longitudinal axis at different points along said longitudinal axis.

8. The assembly of claim 7, wherein:
   (a) a first mounting engagement structure, which is fixedly engaged to a first end of said spring body, is comprised of one only of a first male mounting member and a first female mounting member;
   (b) a first mounting point, which is fixedly engaged to said spring conformance component, is comprised of whichever of said first male mounting member and said first female mounting member which said first mounting engagement structure is not comprised of;
   (c) said first male mounting member is engaged within a mounting recess defined by said first female mounting member;
   (d) said first female mounting member and said first male mounting member are constructed and engaged to one another such that relative rotation between said first female mounting member and said first male mounting member is prevented about a moment support axis;
   (e) said first female mounting member and said first male mounting member are engaged to other components of said assembly in an orientation such that said moment support axis is disposed parallel to said spring conformance surface and perpendicular to said longitudinal axis of said spring body such that an internal moment, which is present in said spring body about an axis which is parallel to said spring conformance surface, is transferred from said spring body through said first female mounting member and said first male mounting member to said spring conformance component.

9. The assembly of claim 8, wherein:
   (a) said spring member is comprised of a sheet with substantially uniform thickness throughout; and
   (b) said sheet forms one or more stiffening features which extend parallel to said longitudinal axis and which stiffen said spring body against bending along said longitudinal axis of said spring body.

10. The assembly of claim 8, wherein:
(a) said first female mounting member is comprised of at least two mounting tines which are fixedly engaged directly or indirectly to either said first end of said spring body or to said spring conformance component;
(b) at least two of said at least two mounting tines of said first female mounting member are parallel mounting tines which are disposed substantially parallel to one another such that said mounting recess is defined between said parallel mounting tines;
(c) said first male mounting member is comprised of a mounting plate which is fixedly engaged directly or indirectly to whichever of said spring conformance component and said first end of said spring body which said at least two mounting tines are not engaged to;
(d) said mounting plate is disposed within said mounting recess defined between said parallel mounting tines; and
(e) said parallel mounting tines are separated by a distance such that a mounting recess width of said mounting recess is slightly greater than a plate thickness of said mounting plate.

11. The assembly of claim 10, wherein:
(a) said first female mounting member is further comprised of a bridge which is fixedly engaged to one end of each of said at least two mounting tines of said first female mounting member; and
(b) wherein each of said at least two mounting tines, of said first female mounting member, extends in a substantially common direction from said bridge.

12. The assembly of claim 11, wherein:
(a) said first mounting engagement structure is comprised of said first female mounting member and said first mounting point is comprised of said first male mounting member;
(b) said first female mounting member is an integral extension of said spring body;
(c) a spring body engagement end of a spring body engagement tine of said first female mounting member is fixedly engaged to said first end of said spring body;
(d) a bridge engagement end of said spring body engagement tine of said first female mounting member is fixedly engaged to a first end of said bridge of said first female mounting member;
(e) a second end of said bridge of said first female mounting member is fixedly engaged to a bridge engagement end of an outer mounting tine of said first female mounting member; and
(f) said spring body engagement tine and said outer mounting tine extend in a substantially common direction and in a substantially parallel manner from said bridge such that said mounting recess is defined between said spring body engagement tine and said outer mounting tine of said first female mounting member.

13. The assembly of claim 12, wherein:
(a) said spring conformance component is a component designed to be used on the vehicle; and
(b) an object which is disposed between said surface conforming spring and said spring conformance surface is maintained adjacent said spring conformance surface by said surface conforming spring.

14. The assembly of claim 13, wherein:
(a) said spring conformance component is designed to be included as one of the outer body panels of the cabin of the vehicle or a portion of the hood of the vehicle.

15. The assembly of claim 14, wherein:
(a) the engine compartment hood of the vehicle is comprised of said spring conformance component;
(b) said spring conformance surface is defined on an underside of said spring conformance component;
(c) said spring conformance surface has a side portion which is substantially vertical and which has relatively large radii of curvature;
(d) said spring conformance surface has an upper portion which is substantially horizontal and which has relatively large radii of curvature;
(e) said spring conformance surface has a corner portion which is disposed between said side portion and said upper portion and which has relatively small radii of curvature;
(f) said object which is held adjacent said spring conformance surface is comprised of a flexible sound insulating material;
(g) a portion of said sheet of said spring body which is adjacent said side portion of said spring conformance surface defines a first rib which extends along said longitudinal axis of said spring member;
(h) a portion of said sheet of said spring body which is adjacent said corner portion of said spring conforming surface lacks stiffening features; and
(i) a portion of said sheet of said spring body which is adjacent said upper portion of said spring conformance surface defines a second rib which extends along said longitudinal axis of said spring member.

16. The assembly of claim 15, wherein:
(a) a first portion of said spring body has a stiffness against bending which is a first stiffness against bending;
(b) a second portion of said spring body has a stiffness against bending which is a second stiffness against bending;
(c) a portion of said spring conformance surface, adjacent which said first portion of said spring body is disposed, has a radius of curvature which is a first radius of curvature;
(d) a portion of the spring conformance surface, adjacent which said second portion of said spring body is disposed, has a radius of curvature which is a second radius of curvature; and
(e) a ratio of said first stiffness against bending to said second stiffness against bending is similar to a ratio of said first radius of curvature to said second radius of curvature.

17. A surface conforming spring for holding an object such as a sound absorbing liner adjacent an underside of an engine compartment hood which has a side portion which is substantially vertical and has relatively large radii of curvature, an upper portion which is substantially horizontal and has relatively large radii of curvature, and a corner portion disposed between the side portion and the upper portion and which has relatively small radii of curvature and which engine compartment hood also has mounting points which may be mounting plates fixedly engaged to the engine compartment hood adjacent the underside of the engine compartment hood, comprising:
(a) a spring body extending along a longitudinal axis of said surface conforming spring;
(b) at least two mounting engagement structures each of which is disposed at an end of said spring body;

(c) wherein each of said two mounting engagement structures is designed to be engaged to one of the mounting points which are fixedly engaged to the engine compartment hood;

(d) wherein said spring body is constructed such that a stiffness of said spring body against bending varies along said longitudinal axis of said spring body;

(e) wherein when said surface conforming spring is properly installed, said mounting engagement structures at said ends of said spring body are engaged to the mounting points, and said spring body of said surface conforming spring is disposed relatively close to the spring conformance surface between the mounting points;

(f) wherein said spring body is comprised of a spring member which extends from one end of said longitudinal axis of said surface conforming spring, along said longitudinal axis of said surface conforming spring, to an opposite end of said longitudinal axis of said surface conforming spring;

(g) said spring member is constructed such that it has cross-sections of different shape and/or size perpendicular to said longitudinal axis at different points along said longitudinal axis;

(h) said spring member is comprised of a sheet with substantially uniform thickness throughout;

(i) a portion of said sheet of said spring body which is designed to be disposed adjacent the side portion of the underside of the engine compartment hood defines a first rib which extends along said longitudinal axis of said spring member;

(j) a portion of said sheet of said spring body which is designed to be adjacent said corner portion of the underside of the engine compartment hood lacks stiffening features; and (k) a portion of said sheet of said spring body which is designed to be adjacent said upper portion of said spring conformance surface defines a second rib which extends along said longitudinal axis of said spring member.

18. The surface conforming spring of claim 17, wherein:

(a) one or more of said two mounting engagement structures is comprised of a female mounting member which is an integral extension of said spring body;

(b) a spring body engagement end of a spring body engagement tine of each respective female mounting member is fixedly engaged to an end of said spring body;

(c) a bridge engagement end of said spring body engagement tine of each respective female mounting member is fixedly engaged to a first end of a bridge of each respective female mounting member;

(d) a second end of said bridge of each respective female mounting member is fixedly engaged to a bridge engagement end of an outer mounting tine;

(e) said spring body engagement tine and said outer mounting tine of each respective female mounting member extend in a substantially common direction and in a substantially parallel manner from said bridge such that a mounting recess, in which the mounting plate which is fixedly engaged to the engine compartment hood is to be disposed when said surface conforming spring is mounted, is defined between said spring body engagement tine and said outer mounting tine of said female mounting member.

19. A vehicle, comprising:

(a) a frame;

(b) a cabin engaged to said frame;

(c) a suspension system for supporting said vehicle engaged to said frame;

(d) an engine compartment hood engaged to said frame and/or said cabin;

(e) wherein said cabin or said engine compartment hood is comprised of a spring conformance component which defines a spring conformance surface;

(f) wherein said spring conformance surface is of either a concave or convex nature and different portions of said spring conformance surface may have different radii of curvature;

(g) mounting points fixedly engaged either directly or indirectly to said spring conformance component and disposed adjacent said spring conformance surface;

(h) a surface conforming spring engaged to said mounting points and disposed adjacent said spring conformance surface;

(i) wherein said surface conforming spring is comprised of a spring body extending along a longitudinal axis of said surface conforming spring;

(j) wherein said surface conforming spring is comprised of two mounting engagement structures;

(k) wherein each of said two mounting engagement structures is engaged to an end of said spring body;

(l) wherein each of said two mounting engagement structures is also engaged to one of said mounting points;

(m) wherein said surface conforming spring is maintained in a stable manner between said mounting points and adjacent said spring conformance surface;

(n) wherein said spring body is constructed such that a stiffness of said spring body against bending varies along said longitudinal axis of said spring body;

(o) wherein portions of said spring body which are located next to portions of said spring conformance surface which have relatively large radii of curvature have a relatively high stiffness against bending;

(n) wherein portions of said spring body which are located next to portions of said spring conformance surface which have relatively small radii of curvature have a relatively low stiffness against bending; and (o) wherein said spring conformance component is of a relatively rigid construction such that said spring conformance surface is deformed substantially less from its free state than said surface conforming spring is deformed from its free state.

20. The vehicle of claim 19, wherein:

(a) said spring body is comprised of a spring member which extends from one end of said longitudinal axis of said surface conforming spring, along said longitudinal axis of said surface conforming spring, to an opposite end of said longitudinal axis of said surface conforming spring; and (b) said spring member is constructed such that it has cross-sections of different shape and/or size perpendicular to said longitudinal axis at different points along said longitudinal axis.

21. The vehicle of claim 20, wherein:

(a) a first mounting engagement structure, which is fixedly engaged to a first end of said spring body, is comprised of one only of a first male mounting member and a first female mounting member;

(b) a first mounting point, which is fixedly engaged to said spring conformance component, is comprised of whichever of said first male mounting member and said first female mounting member which said first mounting engagement structure is not comprised of;

(c) said first male mounting member is engaged within a mounting recess defined by said first female mounting member;

(d) said first female mounting member and said first male mounting member are constructed and engaged to one another such that relative rotation between said first female mounting member and said first male mounting member is prevented about a moment support axis;

(e) said first female mounting member and said first male mounting member are engaged to other components of said vehicle in an orientation such that said moment support axis is disposed parallel to said spring conformance surface and perpendicular to said longitudinal axis of said spring body such that an internal moment, which is present in said spring body about an axis which is parallel to said spring conformance surface, is transferred from said spring body through said first female mounting member and said first male mounting member to said spring conformance component.

22. The vehicle of claim 21, wherein:
(a) said spring member is comprised of a sheet with substantially uniform thickness throughout; and
(b) said sheet forms one or more stiffening features which extend parallel to said longitudinal axis and which stiffen said spring body against bending along said longitudinal axis of said spring body.

23. The vehicle of claim 22, wherein:
(a) said first female mounting member is comprised of at least two mounting tines which are fixedly engaged directly or indirectly to either said first end of said spring body or to said spring conformance component;
(b) at least two of said at least two mounting tines are parallel mounting tines which are disposed substantially parallel to one another such that said mounting recess is defined between said parallel mounting tines;
(c) said first male mounting member is comprised of a mounting plate which is fixedly engaged directly or indirectly to whichever of said spring conformance component and said first end of said spring body which said at least two mounting tines are not engaged to;
(d) said mounting plate is disposed within said mounting recess defined between said parallel mounting tines; and
(e) said parallel mounting tines are separated by a distance such that a mounting recess width of said mounting recess is slightly greater than a plate thickness of said mounting plate.

24. The vehicle of claim 23, wherein:
(a) said first female mounting member is further comprised of a bridge which is fixedly engaged to one end of each of said at least two mounting tines of said first female mounting member; and
(b) wherein each of said at least two mounting tines, of said first female mounting member, extends in a substantially common direction from said bridge.

25. The vehicle of claim 24, wherein:
(a) said first mounting engagement structure is comprised of said first female mounting member and said first mounting point is comprised of said first male mounting member;

(b) said first female mounting member is an integral extension of said spring body;

(c) a spring body engagement end of a spring body engagement tine of said first female mounting member is fixedly engaged to said first end of said spring body;

(d) a bridge engagement end of said spring body engagement tine of said first female mounting member is fixedly engaged to a first end of said bridge of said first female mounting member;

(e) a second end of said bridge of said first female mounting member is fixedly engaged to a bridge engagement end of an outer mounting tine of said first female mounting member; and (f) said spring body engagement tine and said outer mounting tine extend in a substantially common direction and in a substantially parallel manner from said bridge such that said mounting recess is defined between said spring body engagement tine and said outer mounting tine of said first female mounting member.

26. The vehicle of claim 25, wherein:
(a) an object is disposed between said surface conforming spring and said spring conformance surface and is maintained adjacent said spring conformance surface by said surface conforming spring.

27. The vehicle of claim 26, wherein:
(a) said engine compartment hood is comprised of said spring conformance component;
(b) said spring conformance surface is defined on an underside of said spring conformance component;
(c) said spring conformance surface has a side portion which is substantially vertical and which has relatively large radii of curvature;
(d) said spring conformance surface has an upper portion which is substantially horizontal and which has relatively large radii of curvature;
(e) said spring conformance surface has a corner portion which is disposed between said side portion and side upper portion and which has relatively small radii of curvature;
(f) said object which is held adjacent said spring conformance surface is comprised of a flexible sound insulating material;
(g) a portion of said sheet of said spring body which is adjacent said side portion of said spring conformance surface defines a first rib which extends along said longitudinal axis of said spring member;
(h) a portion of said sheet of said spring body which is adjacent said corner portion of said spring conforming surface lacks stiffening features; and
(i) a portion of said sheet of said spring body which is adjacent said upper portion of said spring conformance surface defines a second rib which extends along said longitudinal axis of said spring member.

28. The vehicle of claim 27, wherein:
(a) a first portion of said spring body has a stiffness against bending which is a first stiffness against bending;
(b) a second portion of said spring body has a stiffness against bending which is a second stiffness against bending;
(c) a portion of said spring conformance surface, adjacent which said first portion of said spring body is disposed, has a radius of curvature which is a first radius of curvature;

(d) a portion of the spring conformance surface, adjacent which said second portion of said spring body is disposed, has a radius of curvature which is a second radius of curvature; and (e) a ratio of said first stiffness against bending to said second stiffness against bending is similar to a ratio of said first radius of curvature to said second radius of curvature.

29. A vehicle, comprising:

(a) a frame;

(b) a cabin engaged to said frame;

(c) a suspension system for supporting said vehicle engaged to said frame;

(d) an engine compartment hood engaged to said frame and/or said cabin;

(e) wherein said cabin or said engine compartment hood is comprised of a spring conformance component which defines a spring conformance surface;

(f) wherein said spring conformance surface is of either a concave or convex nature and different portions of said spring conformance surface may have different radii of curvature;

(g) mounting points fixedly engaged either directly or indirectly to said spring conformance component and disposed adjacent said spring conformance surface;

(h) a surface conforming spring engaged to said mounting points and disposed adjacent said spring conformance surface;

(i) wherein said surface conforming spring is comprised of a spring body extending along a longitudinal axis of said surface conforming spring;

(j) wherein said surface conforming spring is comprised of two mounting engagement structures;

(k) wherein each of said two mounting engagement structures is engaged to an end of said spring body;

(l) wherein each of said two mounting engagement structures is also engaged to one of said mounting points;

(m) wherein said surface conforming spring is maintained in a stable manner between said mounting points and adjacent said spring conformance surface;

(n) wherein said spring body is constructed such that a stiffness of said spring body against bending varies along said longitudinal axis of said spring body;

(o) wherein portions of said spring body which are located next to portions of said spring conformance surface which have relatively large radii of curvature have a relatively high stiffness against bending;

(p) wherein portions of said spring body which are located next to portions of said spring conformance surface which have relatively small radii of curvature have a relatively low stiffness against bending;

(q) wherein said spring conformance component is an outer body panel of either said cabin or said engine compartment hood of said vehicle; and (r) an object which is disposed between said surface conforming spring and said spring conformance surface and is maintained adjacent said spring conformance surface by said surface conforming spring.

30. The vehicle of claim 29, wherein:

(a) said engine compartment hood is comprised of said spring conformance component;

(b) said spring conformance surface is defined on an underside of said spring conformance component;

(c) said spring conformance surface has a side portion which is substantially vertical and which has relatively large radii of curvature;

(d) said spring conformance surface has an upper portion which is substantially horizontal and which has relatively large radii of curvature;

(e) said spring conformance surface has a corner portion which is disposed between said side portion and side upper portion and which has relatively small radii of curvature;

(f) said object which is held adjacent said spring conformance surface is comprised of a flexible sound insulating material;

(g) a portion of said sheet of said spring body which is adjacent said side portion of said spring conformance surface defines a first rib which extends along said longitudinal axis of said spring member;

(h) a portion of said sheet of said spring body which is adjacent said corner portion of said spring conforming surface lacks stiffening features; and (i) a portion of said sheet of said spring body which is adjacent said upper portion of said spring conformance surface defines a second rib which extends along said longitudinal axis of said spring member.

* * * * *